United States Patent [19]

Repphun et al.

[11] Patent Number: 4,924,337
[45] Date of Patent: May 8, 1990

[54] DISK DRIVE SERVO SHIELD

[75] Inventors: William Repphun; David Harper, both of Boulder, Colo.

[73] Assignee: MiniScribe Corporation, Longmont, Colo.

[21] Appl. No.: 186,184

[22] Filed: Apr. 26, 1988

[51] Int. Cl.⁵ .......................... G11B 5/02; G11B 5/115
[52] U.S. Cl. ...................................... 360/128; 360/104
[58] Field of Search ................................ 360/128, 104

[56] References Cited

U.S. PATENT DOCUMENTS 4,402,025  8/1983  Anderson et al. .................. 360/128
4,811,140  3/1989  Enami et al. ....................... 360/104

FOREIGN PATENT DOCUMENTS 60-136024  7/1985  Japan .................................. 360/128

OTHER PUBLICATIONS

Elliott et al., "Magnetic Shield for Disk File," IBM TDB, vol. 19, No. 4, Sep. 1976, pp. 1437-1438.

Dickie et al., "Magnetic Shield Assembly," IBM TDB, vol. 19, No. 4, Sep. 1976, p. 1439.

Primary Examiner—John H. Wolff
Attorney, Agent, or Firm—Curtis, Morris & Safford

[57] ABSTRACT

A servo shield used in small Winchester drives is provided to minimize undesired crosstalk between a data read/write head used in a stack of hard disks and servo information that is provided on an adjacent disk. In the present invention, one surface of a middle disk is provided with servo information which is used to make certain that the head drive assembly, or actuator, positions the heads above the center of the data track regardless of thermal effects or other factors that might introduce errors. In order to avoid crosstalk between the data head and the adjacent servo head reading the servo information, a servo shield formed of a suitable material, preferably berylium copper, is positioned between the servo head and its adjacent corresponding read/write head. This servo shield is mounted interiorly of the housing and slides between the servo head and adjacent read/write head when the housing is finally assembled.

9 Claims, 2 Drawing Sheets

DISK DRIVE SERVO SHIELD

BACKGROUND OF THE INVENTION

The present invention relates to the field of servo shields used in small Winchester disk drives to minimize undesired crosstalk between a data read/write head used in a "stack" of hard disks and servo information that is recorded on an adjacent disk.

In the past, to insure good tracking performance, one surface of a disk in a stack of hard disks rotated by a spindle is provided with "servo" information which, as is conventional, is used to make certain that the head drive assembly, or actuator, positions the heads above the center of a data track regardless of thermal effects or other factors that might introduce errors. The use of a "servo surface" on one of the disks in a disk drive is well known.

It is also known that a head which writes data onto or reads data from a surface (that is, a head other than the servo head) might generate "fringing" electromagnetic fields that can be picked up by the servo head (that is, the head that normally reads the servo information on the servo surface) to introduce errors into the servo loop. Crosstalk between the wires connected to the read/write head and servo head have also been encountered. To avoid such crosstalk, the servo surface in small Winchester disk drives is almost always provided on the bottom surface of the lower-most disk. This placement has resulted since the disk itself shields leakage and fringing fields from reaching the bottom surface of the lower-most disk. In order to prevent crosstalk interference from the data head fringing field to the servo head, magnetic shields have been affixed directly on rotary carriages of the actuator (See U.S. Pat. No. 4,430,678 to Van de Bult). These shields have been placed above the uppermost head and below the lower-most head to prevent fields produced by, for example, a motor, from interfering with data read or written by any of the protective heads.

However, it is desirable to place this servo surface on a middle disk when a large number of disks are stacked in a disk drive. Any positioning errors that might be caused by tilting of the disk stack or actuator mechanism are reduced if the servo loop uses a middle disk for sensing servo information. But, in such a configuration, a data head will be positioned above the servo head, thereby giving rise to crosstalk interference from the data head fringing field to the servo head. It is therefore desirable to avoid this crosstalk by providing a shield formed of suitable material between the data and servo heads.

OBJECTS OF THE INVENTION

It is a general object of this invention to provide a servo shield to minimize undesirable crosstalk between a data read/write head and a servo head in a Winchester disk drive.

It is a further object of this invention to provide a servo shield used in small Winchester disk drives to minimize undesirable crosstalk between a data read/write head used in a stack of hard disks and the servo head while it is reading the servo information.

It is yet another object of this invention to provide a servo shield used in small Winchester disk drives to minimize undesired crosstalk between a data read/write head used in a stack of hard disks and a servo head on an adjacent disk.

It is still a further object of this invention to provide a servo shield used in small Winchester disk drives to minimize undesired crosstalk between the wires leading to a data read/write head used in a stack of hard disks and the wire leading to a servo head on an adjacent disk.

It is yet another object of this invention to provide a servo shield used in small Winchester disk drives to minimize undesired crosstalk between a data read/write head and a servo head which is made of berylium copper and is mounted within the system independent of the servo head and the corresponding read/write head.

Other objects and advantages of the invention will become apparent from the following detailed description and from the appended drawings in which like numbers have been used to describe like parts of the several views.

SUMMARY OF THE INVENTION

The present invention relates to a servo shield used in small Winchester disk drives to minimize undesired crosstalk between a data read/write head used in a stack of hard disks and a servo head on an adjacent disk. The disk drive system of the present invention includes a housing which is formed of two sections and a plurality of hard disks which are fixedly mounted in one half of the housing and concentrically arranged on a spindle of a D.C. motor for rotation within the housing. Each hard disk has a first and second surface with one of the surfaces of one of the disks being provided with servo information. The area between two adjacent disks supported within the housing forms a gap.

To insure good tracking performance, one surface of a middle disk is provided with "servo" information which is used to make certain that the head drive assembly, or actuator, positions the heads above the center of the data track regardless of thermal effects or other factors that might introduce errors. The present invention further includes a servo head which reads the servo information on the servo surface and a plurality of read/write heads which write digital information on and read digital information from corresponding surfaces of the hard disk other than the servo surface. The servo head is mounted adjacent to a read/write head in a back-to-back relationship in the gap between the two disks.

In order to minimize undesired crosstalk between the servo head and the adjacent read/write head and their associated wiring, a servo shield is positioned between the servo head and the adjacent read/write head in the gap and is mounted interiorly of the housing independent of the servo head and the corresponding read/write head. The servo shield is preferably made of berylium copper and is approximately 0.010 inches thick. In this manner, this servo shield reduces crosstalk or other interference between the back-to-back servo and data heads.

BRIEF DESCRIPTION OF THE DRAWINGS

The following detailed description, given by way of example but not intended to limit the present invention solely to the specific embodiments described, may thus be understood in conjunction with the accompanying drawings in which.

DETAILED DESCRIPTION OF THE PREFERRED EMBODIMENT

Figure 1:
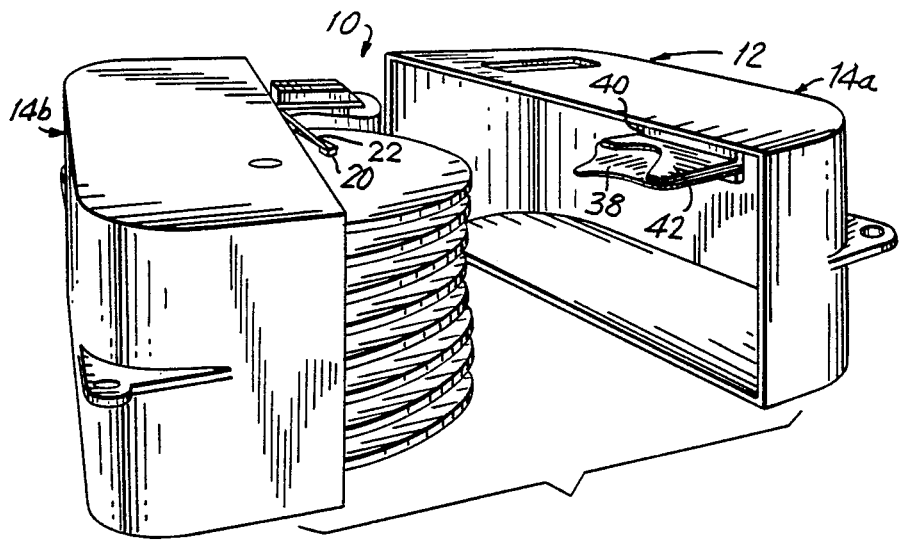
FIG. 1 is a front, perspective view of a preferred embodiment of a computer disk drive system incorporating a servo shield used to minimize undesired crosstalk between a data read/write head and a servo head in a Winchester disk drive.
Figure 4:
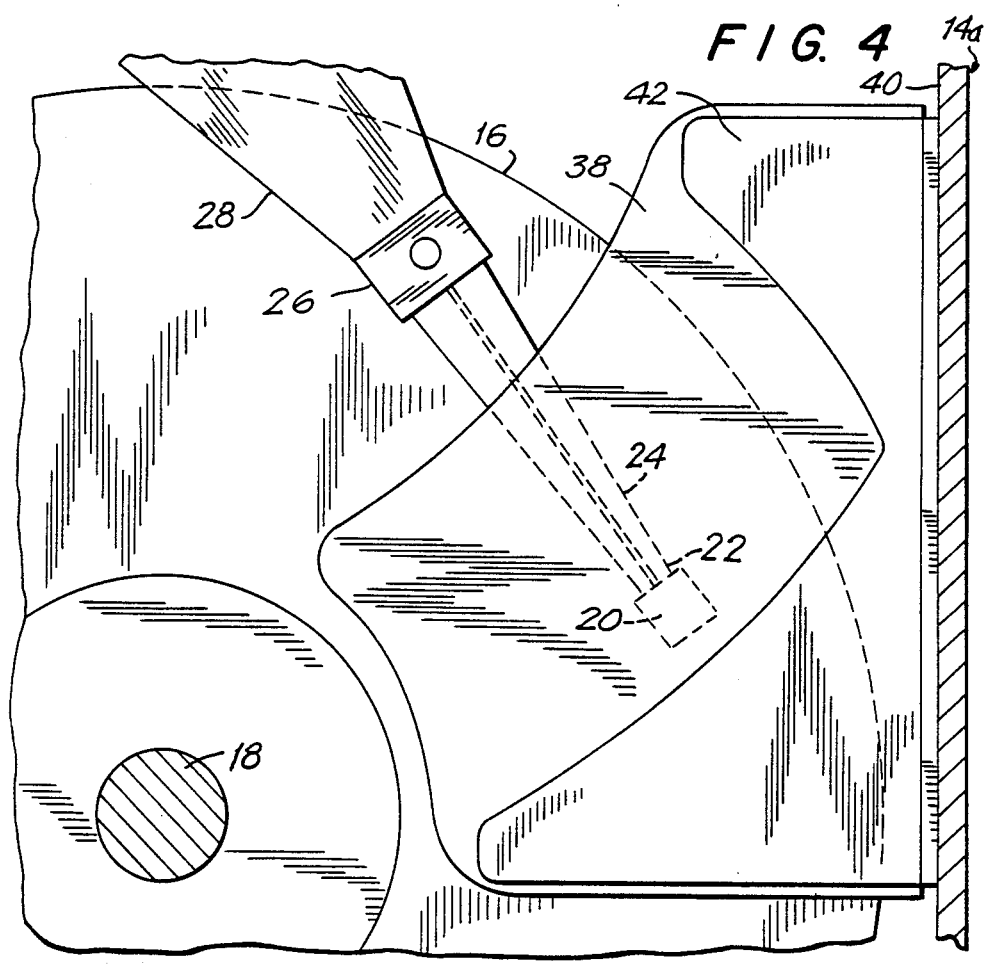
FIG. 4 is an enlarged, top, elevational view taken along line 4—4 of FIG. 3.

A computer disk drive system for operating hard disks in accordance with the present invention is shown in FIG. 1. The disk drive system 10 includes a housing 12 formed of two halves 14a and 14b. These halves may be connected to one another by any suitable fastening means including, but not limited to, screws, rivets and the like.

Figure 2:
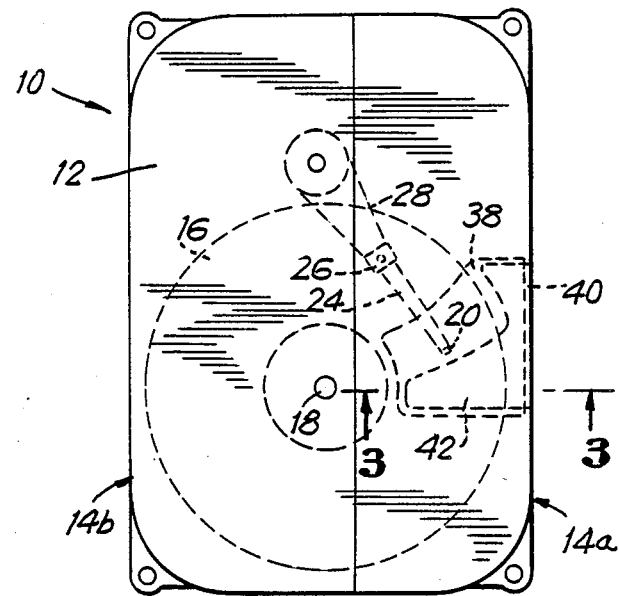
FIG. 2 is a top, elevational view of FIG. 1.
Figure 3:
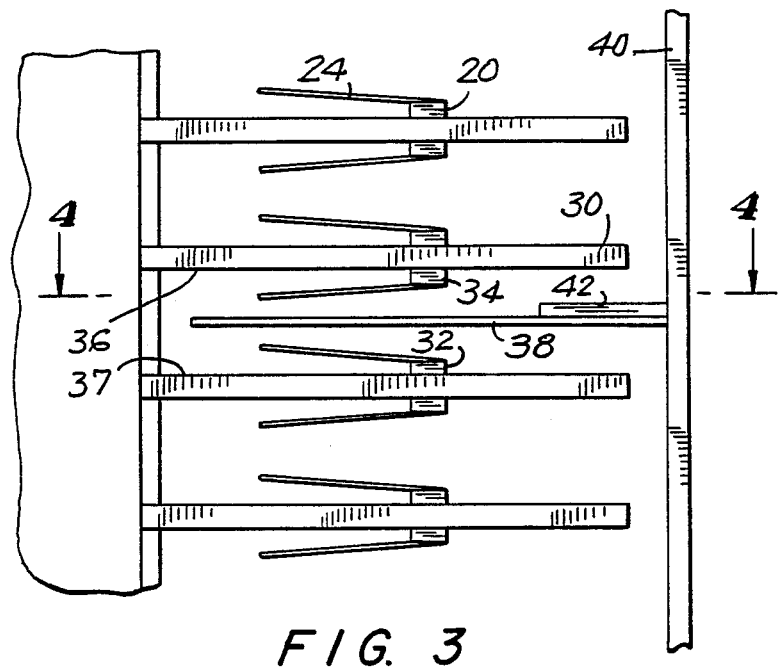
FIG. 3 is a side, plan view taken along line 3—3 of FIG. 2.

As is shown in FIGS. 1-3, a plurality of hard disks 16 are fixedly mounted in one-half of the housing. These disks are concentrically arranged on a spindle 18 of a D.C. motor (not shown) for rotation within the housing. As is shown, a typical read/write magnetic head 20 is mounted on one end 22 of a flexure element 24 which serves as the support arm. The other end 26 of the flexure is attached to a positioning arm 28. FIG. 3 illustrates the manner in which two substantially identical flexure elements 24 are mounted in common, back-to-back relationship. Of course, only a portion of these flexure elements is shown.

In the illustrative embodiment, transducer 20 is a magnetic head adapted to read/write information on or from the magnetic surface of a rotating disk; but it is contemplated that transducer 20 may comprise other conventional devices capable of at least reading information, such as an optical read head, a capacitive pick-up or the like.

To insure good tracking performance, one surface 36 of a middle disk, such as 30, is provided with "servo" information which is used to make certain that the head drive assembly, or actuator, positions the head above the center of a data track regardless of thermal effects or other factors that might introduce errors. It is desirable to place this servo surface such as 36 on a middle disk 30 when a large number of disks are stacked in the disk drive. Any positioning errors that might be caused by tilting of the disk stack or actuator mechanism are reduced if the servo loop uses a middle disk for sensing servo information. As is appreciated, a read/write head (such as head 32) which writes data onto and reads data from a surface may generate "fringing" electromagnetic fields that can be picked up by the servo head 34 (that is, the head that normally reads the servo information on the servo surface 36) to introduce errors into the servo loop. FIG. 3 shows data head 32 positioned adjacent to the servo head 34 thereby giving rise to crosstalk interference from the data head fringing field to the servo head. In addition, the associated wiring (not shown) leading to the servo head and to the adjacent read/write head may give rise to crosstalk interference.

In accordance with one of the general objects of the invention, this crosstalk is avoided by providing a servo shield formed of suitable material between the data and servo heads. This shield 38, preferably made of berylium copper, is fixed to the inner wall 40 of the half of the housing not supporting the stack of disk drives and supported in this position by frame 42. When the halves of the housings 14a and 14b are connected as is shown in FIGS. 2 and 3, this shield slides between the data and servo heads, 32 and 34, respectively, when the housing is finally assembled. Preferably, this servo shield is mounted within the disk drive system independent of the servo head and the corresponding read/write head.

The servo shield is shaped so as to cover as much as possible the area between the back-to-back servo head and read/write head and their flexure elements, which contain the lead wires going to the head. As a result thereof, the servo shield reduces crosstalk interference between the wiring leading to the servo head and the adjacent read/write head. In addition, the servo shield is approximately 0.010 inches thick. As a result thereof, this servo shield minimizes undesired crosstalk between a data read/write head and a servo head in the Winchester disk drive and also permits the servo information to be provided in the servo surface of a middle disk which reduces positioning errors that might be caused by the tilting of the disk stack or actuator.

While the present invention has been particularly shown and described with reference to a preferred embodiment, it will be readily appreciated by those of ordinary skill in the art that various changes and modifications may be made without departing from the spirit and scope of the invention. For example, the servo shield, although preferably being made of berylium copper, may be made of any suitable material which reduces the crosstalk between the servo head and the data read/write head.

It is intended that the appended claims be interpreted as including the foregoing as well as various other such changes and modifications.

What is claimed is:

1. Disk drive apparatus, comprising:
   a housing including interior and exterior surfaces;
   a plurality of hard disks fixedly mounted in the housing with each hard disk having a first and second surface with one of the surfaces of one of the disks being provided with servo information, the area between two adjacent hard disks forming a gap;
   means for rotating said hard disks;
   a plurality of read/write heads which write information on and read information from corresponding surfaces of the hard disks;
   transducer means including a servo head which reads the servo information on the servo surface and is mounted adjacent to a read/write head in back-to-back relationship in the gap between two disks; and
   shielding means mounted directly to the interior surface of the housing and extending inwardly thereof independent of the servo head and the adjacent read/write head and positioned between the servo head and the adjacent read/write head in the gap to minimize undesired cross-talk between the servo head and the adjacent read/write head.

2. The disk drive apparatus of claim 1 wherein said shielding means is made of berylium copper.

3. The disk drive apparatus of claim 1 wherein said shielding means is approximately 0.010 inches thick.

4. The disk drive apparatus of claim 1 further including wiring leading to the servo head and to the read/write heads, wherein the shielding means is shaped so as to cover the gap between the wiring leading to the servo head and the wiring leading to the adjacent read/write head.

5. Disk drive apparatus, comprising;
   a housing including interior and exterior surfaces;

at least three hard disks fixedly mounted in the housing with one surface of an intermediate disk being provided with servo information;

means for rotatably supporting said hard disks;

a plurality of read/write heads which write information on and read information from corresponding surfaces of the hard disks;

transducer means including a servo head which reads the servo information and the servo head being mounted in back-to-back relationship with one of the read/write heads; and shielding means mounted directly to the interior surface of the housing and extending inwardly thereof independent of the servo head and the adjacent read/write head and positioned between the back-to-back servo head and read/write head to minimize undesired cross-talk between the servo head and the adjacent read/write head.

6. The disk drive apparatus of claim 5 wherein the shielding means is made of berylium copper.

7. The disk drive apparatus of claim 5 wherein the shielding means is approximately 0.010 inches thick.

8. The disk drive apparatus of claim 5 wherein the shielding means is mounted within the system independent of the servo head and the adjacent read/write head.

9. Disk drive apparatus comprising:

a housing including interior and exterior surfaces;

at least two hard disks fixed mounted in the housing with one surface of one disk being provided with servo information;

means for rotating said hard disk;

a read/write head which writes information on and reads information from the surface of the hard disk other than the servo surface;

transducer means including a servo head which reads the servo information on the servo surface and is mounted in back-to-back relationship with one of the read/write heads; and shielding means mounted directly to the interior surface of the housing and extending inwardly thereof independent of the servo head and the adjacent read/write head and positioned between the servo head and the adjacent read/write head to minimize undesired cross-talk between the servo head and the adjacent read/write head.

* * * * *